Aug. 14, 1956

J. VIRLOUVET 2,758,644

CONTROL SYSTEM FOR SLATTED ROLLER BLINDS

Filed July 13, 1954

INVENTOR
JACQUES VIRLOUVET

By
Ostrolenk & Faber
ATTORNEYS

Aug. 14, 1956  J. VIRLOUVET  2,758,644
CONTROL SYSTEM FOR SLATTED ROLLER BLINDS
Filed July 13, 1954  3 Sheets-Sheet 2
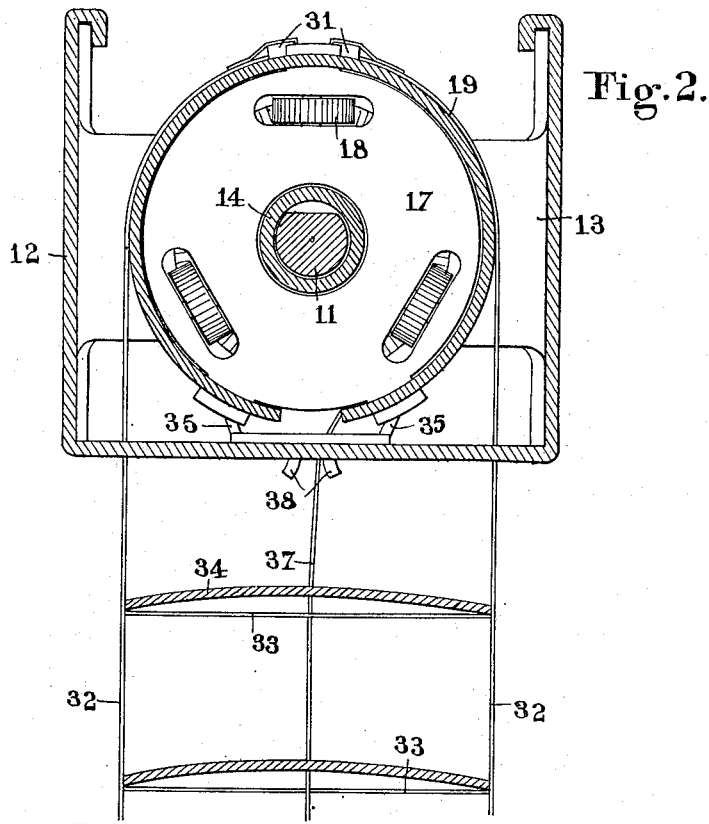
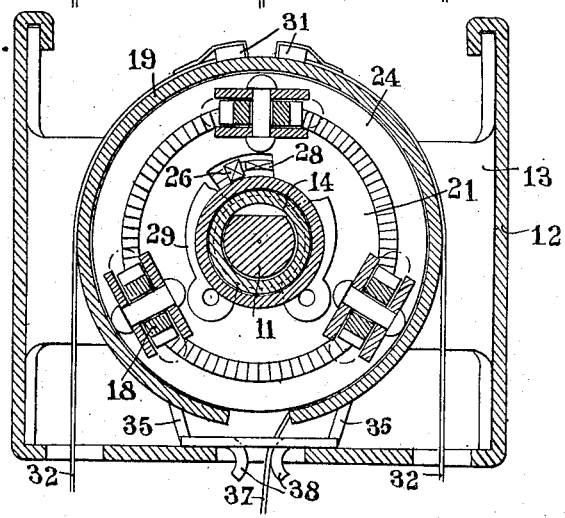
INVENTOR
JACQUES VIRLOUVET
By
*Ostrolenk & Faber*
ATTORNEYS Aug. 14, 1956  J. VIRLOUVET  2,758,644
CONTROL SYSTEM FOR SLATTED ROLLER BLINDS
Filed July 13, 1954  3 Sheets-Sheet 3

INVENTOR
JACQUES VIRLOUVET
By
Ostrolenk & Faber
ATTORNEYS

United States Patent Office 2,758,644
Patented Aug. 14, 1956

2,758,644

CONTROL SYSTEM FOR SLATTED ROLLER BLINDS

Jacques Virlouvet, Paris, France

Application July 13, 1954, Serial No. 443,053

Claims priority, application France July 30, 1953

2 Claims. (Cl. 160—170)

Systems are known for slatted roller blinds, making it possible to control successively the inclination of the slats and their raising or lowering by means of a rotation imparted to a shaft. These devices comprise a friction clutch, the resistance of which has to be overcome in the rotation of the shaft which controls one or the other of the two motions and which, in addition, is liable to wear.

An object of the invention is a system for slatted roller blinds making it possible to control successively the inclination of the slats and their raising or lowering by means of a rotation imparted to a shaft which offers no frictional resistance.

Another object of the invention is a device of the above type constituted, for the greater part of swaged metal sheet and consequently capable of being built on a production scale for a low cost.

Other features and advantages of the invention will appear from the description of one form of embodiment which will be given hereinafter by way of an illustrative and non limitative example, with reference to the drawings wherein:

Figures 2, 3 and 4 are transverse sections respectively along lines II—II, III—III and IV—IV in Figure 1.

Figure 1:
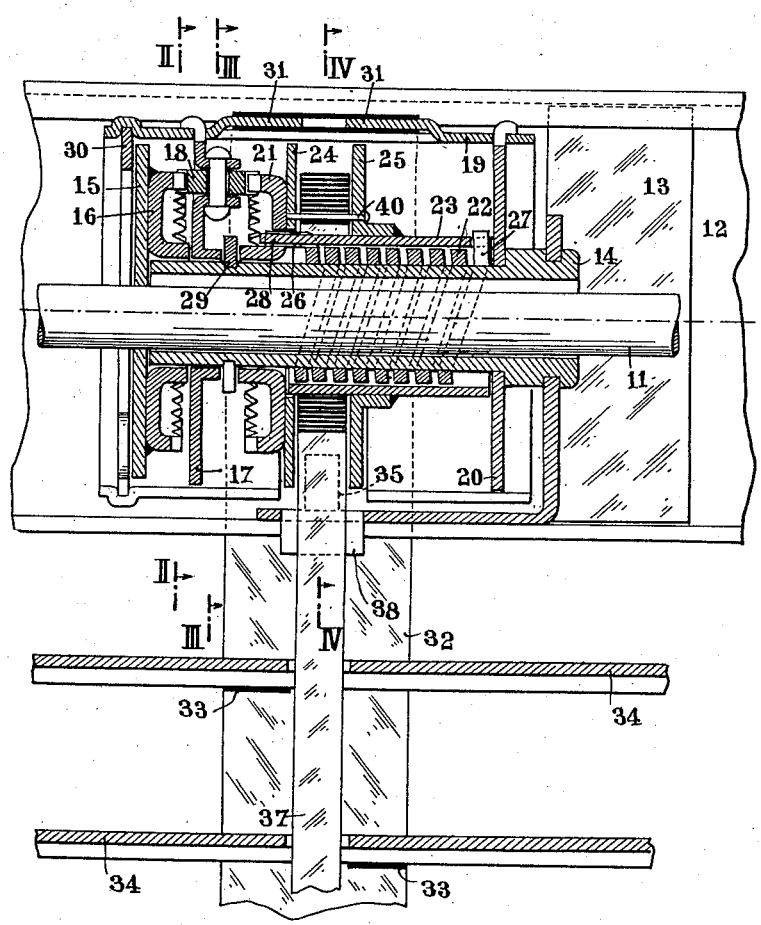
Figure 1 is a section through the axis of the control shaft.

As is known, the control shaft 11 is mounted for free rotation in a rail 12 secured between the two edges of the window. In this rail 12 several devices according to the invention are mounted, each of which comprises a cross brace 13, mounted rigidly in the rail 12 and a socket 14 mounted rigidly on the cross brace and through which passes, axially, the shaft 11 which is provided with a flat land along a generatrix of its surface as may be seen, in particular, in Figures 2, 3 and 4. On the shaft 11 is passed a washer 15 having a central aperture shaped to the contour of the section of the shaft and thus keyed in rotation on said shaft against the left hand end of the fixed socket 14 according to Figure 1. Against this washer 15 is fastened by welding a swaged part 16 having an inner contour engaged in rotation around the end of the socket 14 and a toothed outer contour. Another swaged part 17 mounted for rotation around the socket 14 against the previous part 16 constitutes the cage for three planet wheels 18, secured rigidly to a drum 19 mounted for rotation on the socket 14 by means of this cage 17 and by a centering disc 20. A third swaged part 21, having an inner contour engaged for rotation around the socket 14 and a toothed outer contour engages through this contour the teeth of the pinions 18 opposite those which gear with the toothed contour of the part 16. Around the socket 14, between the third swaged part 21 and the centering disc 20 a helical spring 22 of a substantially square section is engaged by clamping. Around the spring 22 is mounted for rotation a tubular part 23 constituting the shank of a coil around which the cylindrical winding surface is limited by two flanges 24 and 25 secured rigidly around this tubular part 23.

The end 26 of the spring 22 on the side of the part 21 engages a window of said part 21 as may be seen in Figure 3 and the opposite end 27 is engaged rigidly in a hole of the tubular part 23 as seen in Figure 1. A finger 28 associated with the tubular part 23 engages the same window of the part 21 as the end 25 of the spring 22. According to the invention the end 26 and the finger 28 are separated in the window by a certain clearance and succeed each other angularly in this window in the direction of winding of the spring from its end 26.

A circlip 29 mounted around the socket 14 cooperates with the centering disc 20 for keying longitudinally the assembly of the coil 23, 24, 25 and of the part 21 and consequently the drum 19. The rigid assembly of the washer 15 and of the swaged part 16 is held in the gearing position of the teeth of said part 16 with the planet wheels 18 by a circlip 30 engaged in a circular groove inside the drum 19.

The upper portion of the drum 19 is shaped outwardly along clips 31 holding two straps 32 falling, parallel, on both sides of this drum and connected by cross pieces 33 each one of which supports one slat 34 of the blind. On both sides of its upper portion and around the winding surface of the tubular part 23 comprised between the two flanges 24 and 25 the drum 19 is provided with a slot shaped as a circular arc, the bottoms of which may bear on two stops 35, 35 secured rigidly to the cross piece 13. A pin 40, mounted rigidly between the two flanges 24 and 25 in the vicinity of an outer generatrix of the tubular part 23 is used for clutching the end of a lifting cord 37 wound between the two flanges, issuing from the drum 19 through the slot in said drum, going through the bottom of the rail through an aperture between two guides 38, 38 secured on said bottom and going down vertically by going through the slats 34 through holes provided in said slats 34 and by passing between the cross pieces 33 arranged as baffles as indicated in Figure 1, down to a lower end secured to the last slat, which is heavier.

In the angular position of the shaft 11 represented in the drawing, the straps 32 hold the slats 34 in a horizontal position. The control of this shaft 11 in one direction of rotation drives in rotation, in the same direction, the rigid assembly of the washer 15 and the swaged part 16 the toothed contour of which drives in rotation the planet wheels 18. The swaged part 21 is held fixed in rotation by bearing of one edge of the window either on the end 26 of the spring 22 or on the finger 28 of the tubular part 23, one or the other of which offer a resistance due to the clamping action of the spring 22 around the fixed socket 14. Consequently, the planet wheels 18 roll on the toothed contour of the swaged part 21, thus driving in the direction of rotation of the shaft 11 the cage 17 and the drum 19 with its clips 31. The two straps 32 are thus imparted one an upward motion, the other one a downward motion, the combination of which causes the inclination of the slats 34 until one of the bottoms of the slot of the drum 19 bears on one of the two stops 35. In this limiting position and by construction, the slats 34 completely inclined, overlap one another.

Figure 4:
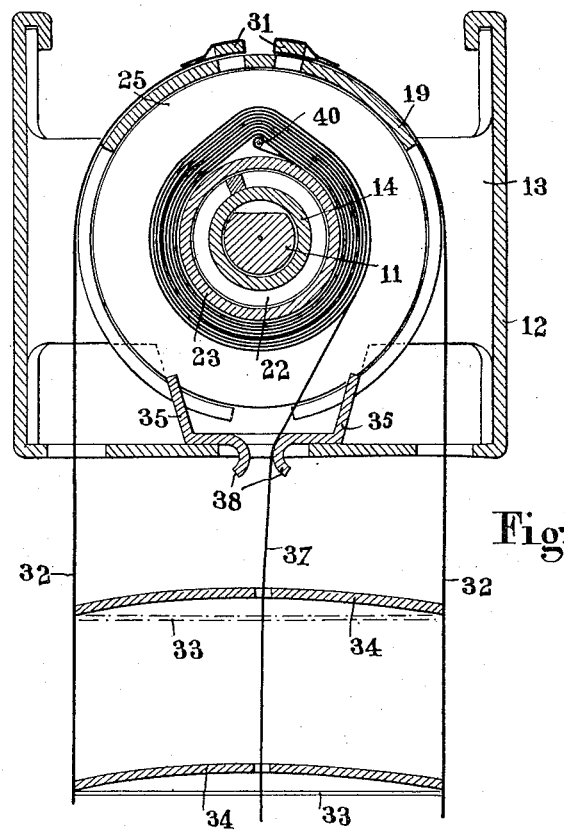
Figure 5:
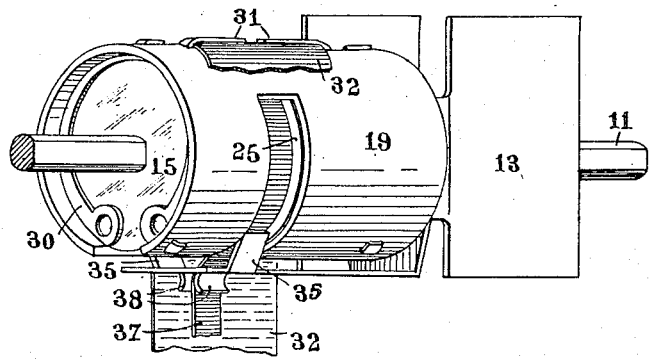
Figure 5 is a view in perspective, on a small scale with parts omitted for the sake of clearness.

The continuation of the rotation motion of the shaft 11 in the same direction continues the rotation of the planet wheels 18 but the immobilization of the cage 7 which carries them, caused by the locking of the drum 19 against a stop 35 prevents them from rolling on the toothed contour of the swaged part 21. They then exert a rotational stress on this part 21 which is transmitted, according to the direction, by one or the other of the two edges of the window to one or the other of the two elements 26 and 28 the arrangement of which, represented in Figure 3 was defined above by the condition that these two elements are arranged angularly in the direction of winding of the spring 22 from its end 26. In these conditions, when the part 21 is pushed in the direction of winding of the spring 22 from its end 26, which is clockwise in Figure 3, it acts in this same direction on this end 26 by pushing it against the elastic resistance of the spring the clamping of which around the fixed socket is thus released. This releasing motion is ended, by construction, when the end 26 of the spring takes up the play it offers with the finger 28 of the tubular part 23. From that time on the left hand bottom, according to Figure 3, of the window in the part 21 pushes, through the end 26 of the spring 22 the finger 28 of the tubular portion 23 and this tubular part 23 is then driven in rotation without any frictional resistance. This rotation of the tubular part 23 causes, as seen in Figure 4, the unwinding of the lifting cord 37 and consequently the lowering of those slats 34 which are placed on top of one another on the last one, until the blind is entirely unrolled. If, on the contrary, the part 21 is pushed in the converse direction of rotation, it acts on the finger 28 which pushes in rotation in this same direction, the tubular part 23. This tubular part 23 acts, in turn, in the same direction on the end 27 of the spring 22. But this direction of rotation, opposite the previous one, is that of the winding of the spring 22 from its end 27 and consequently the starting of the rotation motion of the tubular part 23 causes its unlocking by a releasing of the clamping of the spring 22 around the fixed socket 14. The continuation of this rotation motion then causes, as seen in Figure 4, the winding of the lifting cord 37 and consequently the moving up of these slats 34 which are placed on top of one another on the last one until the window is completely cleared by the lifting of the blind.

What I claim is:

1. A system for slatted roller blinds pierced with holes, making it possible to cause successively the inclination of the slats and their displacement in height by a rotation imparted to a control shaft arranged transversely between the upper edges of the window, said system comprising a rail mounted rigidly between the two edges of the window and having a bottom perforated with apertures, the control shaft being arranged longitudinally for rotation in this rail and several devices each one of which includes a cross brace engaged rigidly in the rail and gone through by the shaft, a socket mounted rigidly on the cross brace and through which the shaft passes coaxially, a toothed crown mounted for rotation and keyed in translation on the socket and associated in rotation with the shaft, a cage mounted for rotation and keyed in translation on the socket, pinions mounted on the cage and gearing with the toothed crown, a drum secured rigidly on the cage, mounted for rotation around the socket, shaped outwardly, at its upper portion, according to clips and provided at its lower portion with a slot in the shape of a circular arc limited by two bottoms, two stops fixed rigidly on the rail and keying the drum in rotation when one of the bottoms of the slot comes and bears on one of the two stops, two straps held at the upper portion of the drum by clips and falling, parallel, on both sides of the drum, cross-pieces connecting these straps and each one of which supports a slat, a coil mounted for rotation and keyed in translation around the socket, means locking in rotation this coil around the socket and capable of being placed in an inoperative position, another toothed crown mounted for rotation around the socket, keyed in translation between the coil and the cage, gearing with the pinions and so shaped as to engage the means for the locking of the coil in rotation and placing these means in an inoperative position when a certain rotational stress is exerted on the second crown, clipping means carried by the coil, a cord having an upper end engaged with the clipping means of the coil, wound on the coil, coming out of the drum through the slot in said drum, going through the bottom of the rail through an aperture in said bottom and going down vertically by going through the slats through the holes in said slats and by going between the cross pieces to terminate into a lower end secured to the last slat.

2. A system for slatted roller blinds, provided with holes, making it possible to cause successively the inclination of the slats and their displacement in height by a rotation imparted to a control shaft arranged transversely between the upper edges of the window, said system comprising a rail mounted rigidly between the two edges of the window, and having a bottom perforated with apertures, the control shaft being arranged longitudinally for rotation in said rail and several devices, each one of which comprises a cross-brace engaged rigidly in the rail and gone through by the shaft, a socket mounted rigidly on the cross brace and through which the shaft passes co-axially, a toothed crown mounted for rotation and keyed in translation on the socket and associated in rotation with the shaft, a cage mounted for rotation and keyed in translation on the socket, pinions mounted on the cage and gearing with the toothed crown, a drum secured rigidly to the cage, mounted for rotation around the socket, shaped outwardly, at its upper portion according to clips and provided at its lower portion with a slot in the shape of a circular arc limited by two bottoms, two stops fixed rigidly on the rail and locking the drum against rotation when one of the bottoms of the slots comes and bears on one of the two stops, two straps held at the upper portion of the drum by the clips and falling parallel on both sides of the drum, cross pieces connecting these straps and each one of which supports a slat a spring formed by an elastic rod with a rectangular section having an end directed radially with respect to the axis of the shaft and wound over the socket with a tightening in a certain direction of winding between its second and first ends, a tubular part mounted for rotation around the spring, having an end provided with a radial hole in which is secured rigidly the first end of the spring and an opposite end turned towards the cage and the pinions and having a finger placed near the second end of the spring, parallel with said second end of the spring and with an offset by a small angular clearance in the direction of winding of the spring, two flanges mounted rigidly around the tubular part and limiting, on said tubular part a winding surface, another toothed crown mounted for rotation around the socket, keyed in translation between one of the flanges and the cage and the pinions, gearing with said pinions and perforated with a window in which are engaged, side by side, the second end of the spring and the finger of the second end of the tubular part, clipping means carried by the coil, a cord having an upper end engaged on the clipping means of the coil, wound on the coil, coming out of the drum through the slot in said drum, going through the bottom of the rail through an aperture in this bottom and going down vertically by going through the slats through the holes in said slats and by passing between the cross pieces for terminating into a lower end secured on the last slat.

References Cited in the file of this patent
UNITED STATES PATENTS 2,231,778    Swanson _____ Feb. 11, 1941
2,604,939    Griesser _____ July 29, 1952